(12) United States Patent
Jun

(10) Patent No.: US 11,832,782 B2
(45) Date of Patent: Dec. 5, 2023

(54) VACUUM CLEANER AND METHOD FOR CONTROLLING SAME

(71) Applicant: LG ELECTRONICS INC., Seoul (KR)

(72) Inventor: Woochan Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 615 days.

(21) Appl. No.: 17/051,485

(22) PCT Filed: Apr. 18, 2019

(86) PCT No.: PCT/KR2019/004700
§ 371 (c)(1),
(2) Date: Oct. 29, 2020

(87) PCT Pub. No.: WO2019/212173
PCT Pub. Date: Nov. 7, 2019

(65) Prior Publication Data
US 2021/0052124 A1    Feb. 25, 2021

(30) Foreign Application Priority Data

Apr. 30, 2018    (KR) .......................... 10-2018-0050105

(51) Int. Cl.
*G05D 1/00*    (2006.01)
*A47L 9/28*    (2006.01)
(Continued)

(52) U.S. Cl.
CPC .......... *A47L 9/2852* (2013.01); *A47L 9/2805* (2013.01); *B25J 11/0085* (2013.01); *G05D 1/0214* (2013.01); *G05D 1/0219* (2013.01); *A47L 2201/04* (2013.01)

(58) Field of Classification Search
CPC .. A47L 9/2852; A47L 9/2805; A47L 2201/04; A47L 9/1409; A47L 9/2857;
(Continued)

(56) References Cited

U.S. PATENT DOCUMENTS 9,914,219 B2    3/2018 Lee et al.
11,606,550 B2 *  3/2023 Horesh ................ G06V 20/10
(Continued)

FOREIGN PATENT DOCUMENTS

CN    1899184 A    1/2007
CN    202976657 U    6/2013
(Continued)

OTHER PUBLICATIONS

Pct International Search Report, dated Aug. 13, 2019, issued in International Patent Application No. PCT/KR2019/004700 (4 pages).
(Continued)

*Primary Examiner* — Ian Jen
(74) *Attorney, Agent, or Firm* — Birch, Stewart, Kolasch & Birch, LLP

(57) ABSTRACT

In order to solve the problem of the present invention, a vacuum cleaner that performs autonomous driving according to an embodiment of the present invention is characterized by comprising: a main body; a driving unit for driving the main body; a camera for detecting 3-dimensional coordinate information; a memory for storing pattern information related to a recharging station; and a control unit which compares the 3-dimensional coordinate information detected by the camera and the pattern information stored in the memory and related to the recharging station, and which determines, on the basis of the comparison result, whether or not the recharging station is positioned in the vicinity of the main body.

15 Claims, 8 Drawing Sheets

(51) Int. Cl.
  *B25J 11/00* (2006.01)
  *G05D 1/02* (2020.01)
(58) Field of Classification Search
  CPC . A47L 11/4036; A47L 9/0686; B25J 11/0085; B25J 9/16; B25J 9/1664; G05D 1/0214; G05D 1/0219
  See application file for complete search history.

(56) References Cited

U.S. PATENT DOCUMENTS

| 2012/0065829 | A1 | 3/2012 | Yu et al. | |
|---|---|---|---|---|
| 2023/0206478 | A1* | 6/2023 | Kessels | G06V 10/141 382/106 |

FOREIGN PATENT DOCUMENTS

| CN | 205080431 | U | 3/2016 |
|---|---|---|---|
| CN | 206950128 | U | 2/2018 |
| EP | 2 325 714 | A2 | 5/2011 |
| EP | 3047773 | A1 | 7/2016 |
| JP | 2744633 | B2 | 4/1998 |
| JP | 2013-106820 | A | 6/2013 |
| JP | 2013-247986 | A | 12/2013 |
| JP | 2014-028034 | A | 2/2014 |
| JP | 5891736 | B2 | 3/2016 |
| JP | 2016-201096 | A | 12/2016 |
| JP | 2017-503267 | A | 1/2017 |
| JP | 2017-153787 | A | 9/2017 |
| JP | 6195649 | B2 | 9/2017 |
| KR | 10-2011-0053760 | A | 5/2011 |
| KR | 10-2016-0091087 | A | 8/2016 |

OTHER PUBLICATIONS

Notice of Allowance, dated Oct. 29, 2019, issued in Korean Patent Application No. KR 10-2018-0050105 (5 pages).
Office Action in Chinese Patent Application No. 201980029528.2, dated May 21, 2021 (16 pages).

* cited by examiner

VACUUM CLEANER AND METHOD FOR CONTROLLING SAME

CROSS-REFERENCE TO RELATED APPLICATIONS

This application is the National Stage filing under 35 U.S.C. 371 of International Application No. PCT/KR2019/004700, filed on Apr. 18, 2019, which claims the benefit of earlier filing date and right of priority to Korean Application No. 10-2018-0050105 filed on Apr. 30, 2018, the contents of which are all hereby incorporated by reference herein in their entirety.

TECHNICAL FIELD

The present disclosure relates to a cleaner and a method for controlling the same, and more particularly, to a cleaner capable of recognizing an obstacle and performing autonomous traveling, and a method for controlling the same.

BACKGROUND

In general, robots have been developed for industrial use and have been partially in charge of factory automation. In recent years, the field of application of robots has been expanded, and medical robots, aerospace robots, and the like have been developed, and household robots that can be used in ordinary homes have also been made.

A representative example of the home robot is a robot cleaner, which is a type of household appliance that sucks and cleans dust or foreign materials around the robot while autonomously traveling in a predetermined area. Such a robot cleaner is generally equipped with a rechargeable battery and an obstacle sensor for avoiding obstacles during traveling. Such structure allows the robot cleaner to perform cleaning while traveling by itself.

In recent years, researches have been actively carried out to utilize the robot cleaner in various fields such as health care, smart home, remote control, and the like, instead of merely performing cleaning by autonomously traveling in a cleaning area.

On the other hand, when a suction unit of the robot cleaner is provided in front of the main body, there is a problem in that cleaning is not sufficiently performed on an area adjacent to a wall during wall following traveling (driving) along the wall of the cleaning area.

In other words, depending on the number of suction units or installation positions, a separate driving pattern is required to minimize an uncleaned area.

In this regard, Korean Patent Application Publication No. 10-2011-0053760 (published on May 24, 2011) discloses a robot cleaner that performs zigzag driving.

However, since the above prior literature above does not disclose a configuration for solving the problem that the area adjacent to the wall is not sufficiently cleaned when performing zigzag driving, there still remains a problem that the user is unsatisfied with the performance of the robot cleaner.

SUMMARY

Technical Problem

One aspect of the present disclosure is to provide a cleaner that performs autonomous traveling (driving), capable of improving a cleaning success rate of an area adjacent to a wall in a cleaning area, and a control method thereof.

Another aspect of the present disclosure is to provide a cleaner that performs autonomous traveling, capable of performing a unique traveling pattern such that the cleaner having a suction unit only on a front side of the main body performs sufficient cleaning for a wall area, and a method for controlling the same.

Technical Solution

In order to solve the technical problem of the present invention as described above, there is provided a main body, a driving unit configured to move the main body, a suction unit installed on a front surface of the main body, and a control unit configured to control the driving unit to move the main body based on a preset traveling pattern. Particularly, when one surface of the main body is brought into contact with a first point of a wall existing in a traveling direction of the main body while the main body moves along the preset traveling pattern, the control unit may control the driving unit such that the one surface of the main body is spaced apart from the wall and then brought into contact with a second point of the wall.

In this case, the cleaner may further include a sensor disposed on an outer surface of the main body to sense an external physical force, and the control unit may determine whether the main body is brought into contact with the wall, based on a sensing result of the sensor.

In one implementation, the control unit may control the driving unit to move the main body backward from the wall by a preset first distance when the main body is brought into contact with the wall.

In one implementation, the control unit may control the driving unit such that a front surface of the main body is brought into contact with the second point of the wall again, spaced by a second distance apart from the first point, when the backward movement of the main body is completed.

In one implementation, the control unit may control the driving unit such that the main body rotates in place by a predetermined angle and moves along a preset path, when the backward movement of the main body is completed.

In one implementation, the control unit may set a direction of rotating the main body based on information related to a movement history of the main body before the main body is brought into contact with the first point.

In one implementation, the control unit may detect an uncleaned area of the wall based on the information related to the movement history, and control the driving unit such that the main body rotates toward the detected uncleaned area.

In one implementation, one end of the preset path may correspond to the second point.

In one implementation, the control unit may control the main body to move away from the wall along a first curved path when the main body is brought into contact with the wall.

In one implementation, the control unit may control the driving unit such that the front surface of the main body is brought into contact again with the second point, spaced by a second distance apart from the first point, when the movement of the main body along the first curved path is completed.

In one implementation, the control unit may control the main body to move along a second curved path when the movement of the main body along the first curved path is completed.

In one implementation, the control unit may set the second curved path to be longer than the first curved path.

In one implementation, the control unit may set a curvature of the first curved path to be larger than a curvature of the second curved path.

In one implementation, the control unit may set a distance between the first point and the second point based on information related to a standard of the main body, and control the driving unit to move the main body based on the set distance.

In one implementation, the control unit may set a distance between the first point and the second point based on a traveling mode of the cleaner, and control the driving unit to move the main body based on the set distance.

Advantageous Effects

According to the present disclosure, a robot cleaner may perform precise movement (travel, driving) in an area around a wall to clean the cleaning area thoroughly, thereby improving performance of the cleaner.

In particular, according to the present disclosure, an uncleaned area in which cleaning cannot be performed by zigzag movement may be minimized, thereby improving user's satisfaction with the cleaner.

DETAILED DESCRIPTION

Hereinafter, description will be given in detail of implementations disclosed herein. Technical terms used in this specification are merely used for explaining specific implementations, and should not be constructed to limit the scope of the technology disclosed herein.

Figure 1:
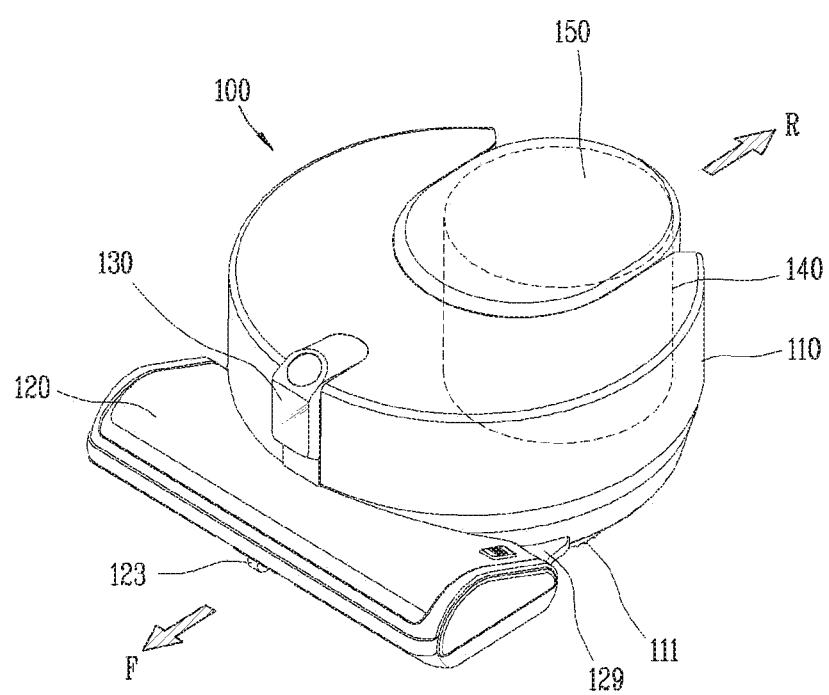
FIG. 1 is a perspective view illustrating an example of a cleaner that performs autonomous traveling according to the present disclosure.
Figure 2:
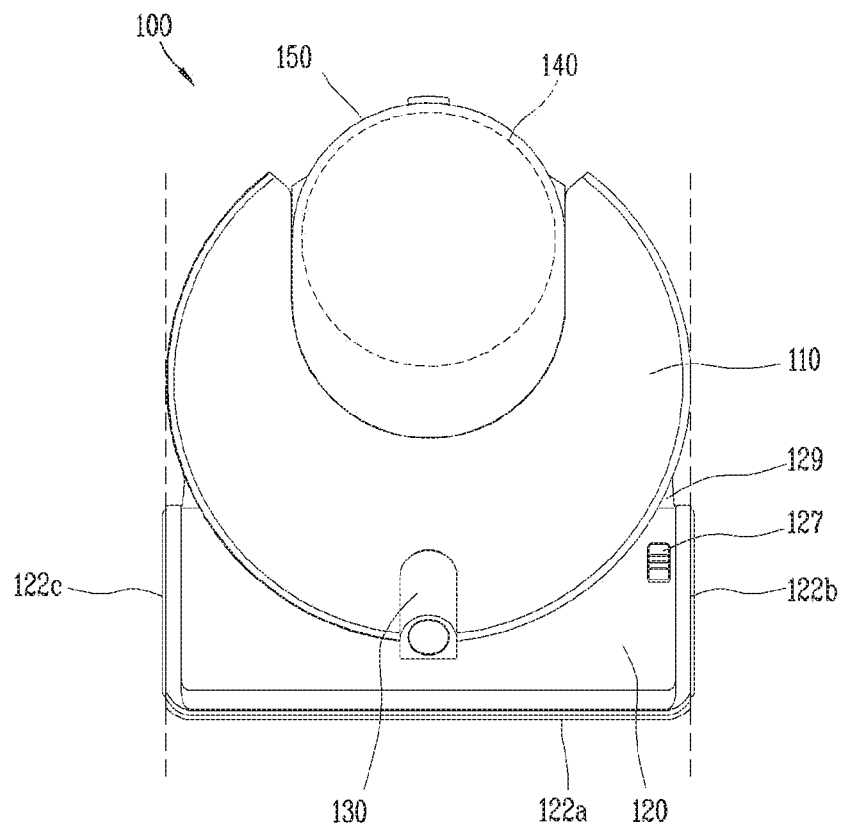
FIG. 2 is a planar view illustrating the cleaner that performs autonomous traveling illustrated in FIG. 1.
Figure 3:
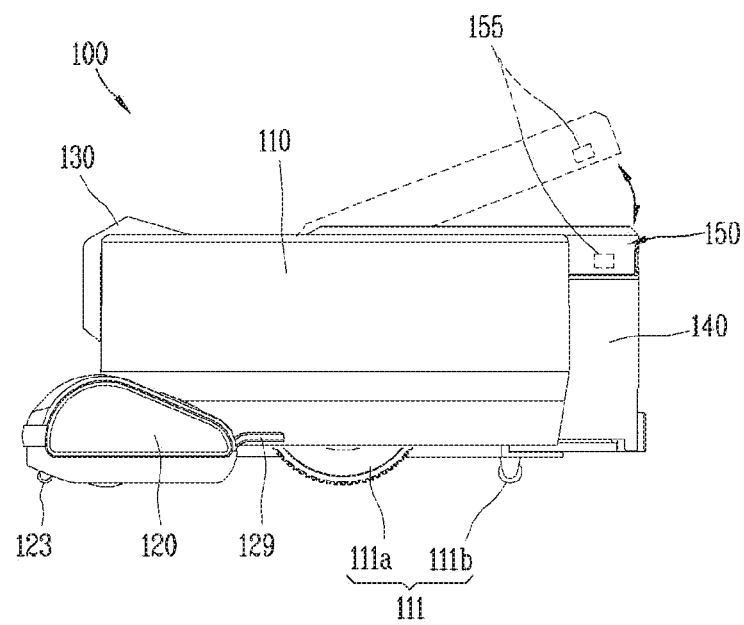
FIG. 3 is a lateral view illustrating the cleaner that performs autonomous traveling illustrated in FIG. 1.

FIG. 1 is a perspective view illustrating one implementation of a robot cleaner 100 according to the present invention, FIG. 2 is a planar view of the robot cleaner 100 illustrated in FIG. 1, and FIG. 3 is a lateral view of the robot cleaner 100 illustrated in FIG. 1.

For reference, in this specification, a mobile robot, a robot cleaner, and a cleaner that performs autonomous traveling may be used in the same sense.

Referring to FIGS. 1 to 3, a robot cleaner 100 performs a function of cleaning a floor while traveling on a predetermined area by itself. Cleaning of a floor mentioned here includes sucking dust (including foreign matter) on the floor or mopping the floor.

The robot cleaner 100 includes a cleaner body 110, a suction unit 120, a sensing unit 130, and a dust box 140.

The cleaner body 110 is provided with a control unit (not shown) for the control of the robot cleaner 100 and a wheel unit 111 for the traveling of the robot cleaner 100. The robot cleaner 100 may move forward, backward, leftward and rightward by the wheel unit 111.

The wheel unit 111 includes main wheels 111a and a sub wheel 111b.

The main wheels 111a are provided on both sides of the cleaner body 110 and configured to be rotatable in one direction or another direction according to a control signal of the control unit. Each of the main wheels 111a may be configured to be driven independently of each other. For example, each main wheel 111a may be driven by a different motor.

The sub wheel 111b supports the cleaner main body 110 together with the main wheels 111a and assists the traveling of the robot cleaner 100 by the main wheels 111a. The sub wheel 111b may also be provided on a suction unit 120 to be described later.

As described above, the control unit is configured to control the traveling of the wheel unit 111 in such a manner that the robot cleaner 100 autonomously travels on the floor.

Meanwhile, a battery (not shown) for supplying power to the robot cleaner 100 is mounted on the cleaner body 110. The battery may be configured to be rechargeable, and configured to be detachable from a bottom portion of the cleaner body 110.

The suction unit 120 is disposed to protrude from one side of the cleaner main body 110 so as to suck air containing dust. The one side may be a side on which the cleaner body 110 travels in a forward direction (F), that is, a front side of the cleaner body 110.

In the present drawing, it is shown that the suction unit 120 is protruded from one side of the cleaner body 110 to a front side and both left and right sides thereof. Specifically, a front end portion of the suction unit 120 is disposed at a position spaced forward apart from the one side of the cleaner main body 110, and left and right end portions of the suction unit 120 are disposed at positions spaced apart from the one side of the cleaner main body 110 in the right and left directions.

As the cleaner main body 110 is formed in a circular shape and both sides of a rear end portion of the suction unit 120 protrude from the cleaner main body 110 to both left and right sides, empty spaces, namely, gaps may be formed between the cleaner main body 110 and the suction unit 120. The empty spaces are spaces between both left and right end portions of the cleaner main body 110 and both left and right end portions of the suction unit 120 and each has a shape recessed into the robot cleaner 100.

If an obstacle is caught in the empty space, the robot cleaner 100 may be likely to be unmovable due to the obstacle. In order to prevent this, a cover member 129 may be disposed to cover at least part of the vacant space. The cover member 129 may be provided on the cleaner main body 110 or the suction unit 120. In this implementation of the present disclosure, the cover member 129 protrudes from each of both sides of the rear end portion of the suction unit 120 and covers an outer circumferential surface of the cleaner main body 110.

The cover member 129 is disposed to fill at least part of the empty space, that is, the empty space between the cleaner main body 110 and the suction unit 120. Therefore, it may be possible to implement a structure capable of preventing an obstacle from being caught in the vacant space, or being easily released from the obstacle even when the obstacle is caught in the vacant space.

The cover member 129 formed to protrude from the suction unit 120 may be supported on an outer circumferential surface of the cleaner body 110. The cover member 129 may be supported on a rear portion of the suction unit 120 if the cover member 129 protrudes from the cleaner main body 110. According to this structure, when the suction unit 120 is impacted due to colliding with an obstacle, a part of the impact is transferred to the cleaner main body 110 so as to be dispersed.

The suction unit 120 may be detachably coupled to the cleaner main body 110. When the suction unit 120 is detached from the cleaner main body 110, a mop module (not shown) may be detachably coupled to the cleaner main body 110 in place of the detached suction unit 120. Accordingly, the user can mount the suction unit 120 on the cleaner main body 110 when the user wishes to remove dust on the floor, and may mount the mop module on the cleaner main body 110 when the user wants to mop the floor.

When the suction unit 120 is mounted on the cleaner main body 110, the mounting may be guided by the cover member 129 described above. That is, as the cover member 129 is disposed to cover the outer circumferential surface of the cleaner main body 110, a relative position of the suction unit 120 with respect to the cleaner main body 110 may be determined.

A sensing unit 130 is disposed in the cleaner body 110. As illustrated, the sensing unit 130 may be disposed on one side of the cleaner main body 110 where the suction unit 120 is located, that is, on a front side of the cleaner main body 110.

The sensing unit 130 may be disposed to overlap the suction unit 120 in an up and down direction of the cleaner main body 110. The sensing unit 130 is disposed at an upper portion of the suction unit 120 so as to detect an obstacle or feature in front of the robot so that the suction unit 120 positioned at the forefront of the robot cleaner 100 does not hit the obstacle.

The sensing unit 130 is configured to additionally perform another sensing function in addition to the sensing function. This will be described in detail later.

The cleaner main body 110 is provided with a dust container accommodating portion. The dust container 140 in which dust separated from the sucked air is collected is detachably coupled to the dust container accommodating portion. As illustrated in the drawing, the dust box accommodation portion 113 may be formed on the other side of the cleaner body 110, namely, behind the cleaner body 110.

A part of the dust container 140 may be accommodated in a dust container accommodating portion and another part of the dust container 140 protrudes toward the rear of the cleaner main body 110 (i.e., a reverse direction R opposite to a forward direction F).

The dust box 140 is formed with an inlet 140*a* through which air containing dust is introduced and an outlet 140*b* through which air separated from dust is discharged, and when the dust box 140 is installed in the dust box accommodation portion 113, the inlet 140*a* and the outlet 140*b* are configured to communicate with a first opening 110*a* and a second opening 110*b* formed in an inner wall of the dust box accommodation portion 113, respectively.

The intake passage in the cleaner body 110 corresponds to a passage from the inlet port (not shown) communicating with the communicating portion 120*b* to the first opening 110*a*, and the discharge passage corresponds to a passage from the second opening 110*b* to the discharge port 112.

According to such connection, air containing dust introduced through the suction unit 120 flows into the dust container 140 through the intake passage inside the cleaner main body 110 and the air is separated from the dust while passing through a filter and cyclone of the dust container 140. Dust is collected in the dust box 140, and air is discharged from the dust box 140 and then discharged to the outside through the discharge port 112 in the cleaner body 110 and finally through the discharge port 112.

Hereinafter, an implementation related to the components of the robot cleaner 100 will be described with reference to FIG. 4.

A robot cleaner 100 or a mobile robot according to an implementation of the present disclosure may include at least one of a communication unit 1100, an input unit 1200, a driving unit 1300, a sensing unit 1400, an output unit 1500, a power supply unit 1600, a memory 1700, and a control unit 1800, or a combination thereof.

Figure 4:
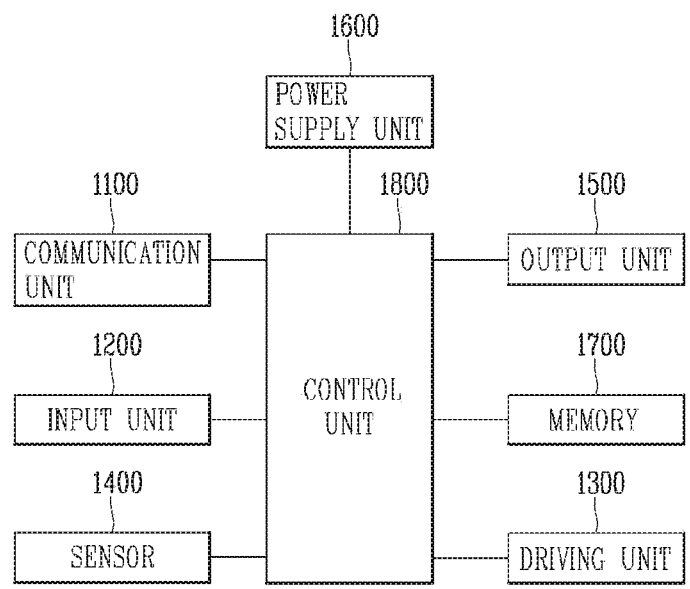
FIG. 4 is a block diagram illustrating components of a cleaner performing autonomous traveling in accordance with one implementation of the present disclosure.

Here, it is needless to say that the components shown in FIG. 4 are not essential, and thus a robot cleaner having more or fewer components than shown in FIG. 4 may be implemented. Hereinafter, each component will be described.

First, the power supply unit 1600 includes a battery that can be charged by an external commercial power supply, and supplies power to the mobile robot. The power supply unit 1600 supplies driving power to each of the components included in the mobile robot to supply operating power required for the mobile robot to travel or perform a specific function.

Here, the control unit 1800 may sense the remaining power of the battery, and control the battery to move power to a charging base connected to the external commercial power source when the remaining power is insufficient, and thus a charge current may be supplied from the charging base to charge the battery. The battery may be connected to a battery sensing portion so that a remaining power level and a charging state can be transmitted to the control unit 1800. The output unit 1500 may display the remaining battery level on a screen under the control of the control unit.

The battery may be located in a lower portion of the center of the robot cleaner or may be located at either one of the left and right sides. In the latter case, the mobile robot may further include a balance weight for eliminating a weight bias of the battery.

On the other hand, the driving unit 1300 may include a motor, and operate the motor to bidirectionally rotate left and right main wheels, so that the main body can rotate or move. The driving unit 1300 may allow the main body of the mobile robot to move forward, backward, leftward and rightward, travel in a curved manner or rotate in place.

On the other hand, the input unit 1200 receives various control commands for the robot cleaner from the user. The input unit 1200 may include one or more buttons, for example, the input unit 1200 may include an OK button, a set button, and the like. The OK button is a button for receiving a command for confirming detection information, obstacle information, position information, and map information from the user, and the setting button is a button for receiving a command for setting those information from the user.

In addition, the input unit 1200 may include an input reset button for canceling a previous user input and receiving a new user input, a delete button for deleting a preset user input, a button for setting or changing an operation mode, a button for receiving an input to return to the charging base, and the like.

In addition, the input unit 1200 may be implemented as a hard key, a soft key, a touch pad, or the like and may be disposed on a top of the mobile robot. For example, the input unit 1200 may implement a form of a touch screen together with the output unit 1500.

On the other hand, the output unit 1500 may be installed on a top of the mobile robot. Of course, the installation position and installation type may vary. For example, the output unit 1500 may display a battery level state, a traveling mode or manner, or the like on a screen.

The output unit 1500 may output internal status information of the mobile robot detected by the sensing unit 1400, for example, a current status of each component included in the mobile robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the mobile robot executed by the control unit 1800 or an operation result. For example, the output unit 1500 may output a warning sound to the outside in accordance with a warning signal generated by the control unit 1800.

In this case, the audio output module may be means, such as a beeper, a speaker or the like for outputting sounds, and the output unit 1500 may output sounds to the outside through the audio output module using audio data or message data having a predetermined pattern stored in a memory (not illustrated).

Accordingly, the mobile robot according to one implementation of the present disclosure can output environmental information related to a travel area through the output unit 1500 or output the same in an audible manner. According to another implementation, the mobile robot may transmit map information or environmental information to a terminal device through the communication unit 1100 so that the terminal device outputs a screen to be output through the output unit 1500 or sounds.

On the other hand, the communication unit 1100 is connected to the terminal device and/or another device (mixed with term "home appliance" in this specification) located in a specific area in one of wired, wireless, satellite communication methods to transmit and receive signals and data.

The communication unit 1100 may transmit and receive data with another located in a specific area. Here, the another device may be any device capable of connecting to a network to transmit and receive data, and for example, the device may be an air conditioner, a heating device, an air purification device, a lamp, a TV, an automobile, or the like. The another device may also be a device for controlling a door, a window, a water supply valve, a gas valve, or the like. The another device may also be a sensor for detecting temperature, humidity, air pressure, gas, or the like.

The memory 1700 stores a control program for controlling or driving the robot cleaner and data corresponding thereto. The memory 1700 may store audio information, image information, obstacle information, position information, map information, and the like. Also, the memory 1700 may store information related to a traveling pattern.

The memory 1700 mainly uses a nonvolatile memory. Here, the non-volatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an impact sensor, an external signal detection sensor, a front detection sensor, a cliff detection sensor, a lower camera sensor, an upper camera sensor and a three-dimensional camera sensor.

The impact sensor may be provided at at least one point on an outer surface of the main body, and may sense a physical force applied to the point.

In one example, the impact sensor may be disposed on the outer surface of the main body to be directed toward the front of the main body. In another example, the impact sensor may be disposed on the outer surface of the body to be directed to the rear of the body. In another example, the impact sensor may be disposed on the outer surface of the main body to be directed toward the left or right side of the main body.

The external signal sensor or external signal detection sensor may sense an external signal of the mobile robot. The external signal detection sensor may be, for example, an infrared ray sensor, an ultrasonic sensor, a radio frequency (RF) sensor, or the like.

The mobile robot may detect a position and direction of the charging base by receiving a guidance signal generated by the charging base using the external signal sensor. At this time, the charging base may transmit a guidance signal indicating a direction and distance so that the mobile robot can return thereto. That is, the mobile robot may determine a current position and set a moving direction by receiving a signal transmitted from the charging base, thereby returning to the charging base.

On the other hand, the front sensors or front detection sensors may be installed at a predetermined distance on the front of the mobile robot, specifically, along a circumferential surface of a side surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the control unit 1800. That is, the front sensor may detect protrusions on the moving path of the mobile robot, household appliances, furniture, walls, wall corners, and the like, and transmit the information to the control unit 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may be provided with a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using an ultrasonic wave radiation time and an ultrasonic wave reception time.

Furthermore, the control unit 1800 may compare ultrasonic waves emitted from the transmitter and ultrasonic waves received at the receiver to detect information related to a size of the obstacle. For example, the control unit 1800 may determine that the obstacle is larger in size when more ultrasonic waves are received in the receiver.

In one implementation, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

That is, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Furthermore, the receiving sensitivities of the receivers may be set to be different from each other.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the mobile robot together with the ultrasonic sensor. The infrared sensor may also sense an obstacle existing at the front or the side to transmit obstacle information to the control unit 1800. In other words, the infrared sensor may sense a protrusion, a household appliance, a furniture, a wall surface, a wall corner, and the like, on the moving path of the mobile robot to transmit the information to the control unit 1800. Therefore, the mobile robot can move within a specific area without collision with an obstacle.

On the other hand, a cliff sensor (or cliff detection sensor) may detect an obstacle on the floor supporting the main body of the mobile robot by mainly using various types of optical sensors.

That is, the cliff sensor may also be installed on a rear surface of the mobile robot on the floor, but may be installed on a different position depending on a type of the mobile robot. The cliff sensor is located on the rear surface of the mobile robot and detects an obstacle on the floor. The cliff sensor may be an IR sensor, an ultrasonic sensor, an RF sensor, a Position Sensitive Detector (PSD) sensor, and the like, which include a transmitter and a receiver, similar to the obstacle detection sensor.

For an example, any one of the cliff detection sensors may be installed in front of the mobile robot, and the other two cliff detection sensors may be installed relatively behind.

For example, the cliff sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared angle between an emission signal of infrared rays emitted from the cliff detection sensor toward the ground and a reflection signal reflected and received by the obstacle to sense a cliff and analyze the depth thereof.

Meanwhile, the control unit 1800 may determine whether to pass a cliff or not according to a ground state of the detected cliff by using the cliff detection sensor, and decide whether to pass the cliff or not according to the determination result. For example, the control unit 1800 determines presence or non-presence of a cliff and a depth of the cliff through the cliff sensor, and then allows the mobile robot to pass through the cliff only when a reflection signal is detected through the cliff sensor.

As another example, the control unit 1800 may also determine lifting of the mobile robot using the cliff sensor.

On the other hand, the lower camera sensor is provided on the rear surface of the mobile robot, and acquires image information regarding the lower side, that is, the bottom surface (or the surface to be cleaned) during the movement. The lower camera sensor is also referred to as an optical flow sensor in other words. The lower camera sensor converts a lower image input from an image sensor provided in the sensor to generate image data of a predetermined format. The generated image data may be stored in the memory 1700.

Also, at least one light source may be installed adjacent to the image sensor. The one or more light sources irradiate light to a predetermined region of the bottom surface captured by the image sensor. That is, while the mobile robot moves in a specific area along the floor surface, a constant distance is maintained between the image sensor and the floor surface when the floor surface is flat. On the other hand, when the mobile robot moves on a floor surface which is not flat, the image sensor and the floor surface are spaced apart from each other by a predetermined distance due to an unevenness and an obstacle on the floor surface. At this time, the at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the mobile robot irrespective of slippage of the mobile robot, using the lower camera sensor. The control unit 1800 may compare and analyze image data captured by the lower camera sensor according to time to calculate a moving distance and a moving direction, and calculate a position of the mobile robot based on the calculated moving distance and moving direction. By using the image information regarding the lower side of the mobile robot captured by the lower camera sensor, the control unit 1800 may perform correction that is robust against slippage with respect to the position of the mobile robot calculated by another element.

On the other hand, the upper camera sensor may be installed so as to face upward or forward of the mobile robot to photograph the surroundings of the mobile robot. When the mobile robot is provided with a plurality of upper camera sensors, the camera sensors may be disposed on a top or side surface of the mobile robot at a determined distance or angle.

The three-dimensional camera sensor may be attached to one side or a part of the main body of the mobile robot to generate three-dimensional coordinate information related to the surroundings of the main body.

That is, the 3D camera sensor may be a 3D depth camera that calculates a remote/near distance between the mobile robot and an object to be captured.

Specifically, the 3D camera sensor may capture 2D images related to surroundings of the main body, and generate a plurality of 3D coordinate information corresponding to the captured 2D images.

In one implementation, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the implementation may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of a region where light of the first pattern and light of the second pattern are incident.

In another implementation, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another implementation, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the 3D camera sensor may be provided with first and second lasers. The first laser irradiates linear laser beams intersecting each other, and the second laser irradiates single linear laser beam. According to this, the lowermost laser is used to detect an obstacle on a bottom, the uppermost laser is used to detect an obstacle on a top, and an intermediate laser between the lowermost laser and the uppermost laser is used to detect an obstacle at a middle portion.

In the following FIG. 5, an implementation showing an installation aspect of a cleaner 100 and a charging station 510 in a cleaning area will be described.

Figure 5:
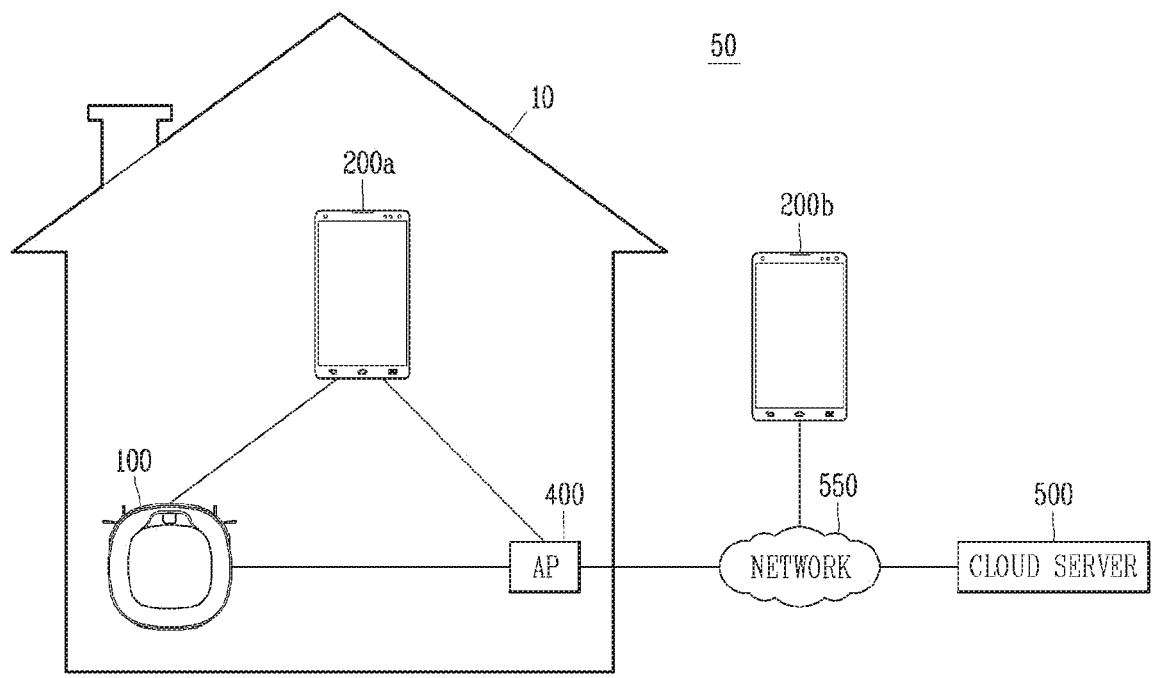
FIG. 5 is a conceptual view illustrating an example in which a cleaner and a charging station according to the present disclosure are installed in a cleaning area.

As shown in FIG. 5, the charging station 510 for charging a battery of the cleaner 100 may be installed in a cleaning area 500. In one implementation, the charging station 510 may be installed at an outer edge of the cleaning area 500.

Although not shown in FIG. 5, the charging station 510 may include a communication device (not shown) capable of emitting different types of signals, and the communication device may perform wireless communication with the communication unit 1100 of the cleaner 100.

The control unit 1800 may control the driving unit 1300 such that the main body of the cleaner 100 is docked to the charging station 510 based on a signal received at the communication unit 1100 from the charging station 510.

The control unit 1800 may move the main body in a direction of the charging station 510 when a remaining capacity of the battery falls below a limit capacity, and control the driving unit 1300 to start a docking function when the main body is close to the charging station 510.

Hereinafter, referring to FIG. 6, a driving method of the cleaner 100 proposed in the present disclosure will be described.

In general, the cleaner 100 performing autonomous driving may move within a cleaning area according to a preset driving pattern 600. The cleaner 100 performing autonomous driving travels in various patterns to minimize a dead zone in which cleaning is not performed within the cleaning area.

Figure 6:
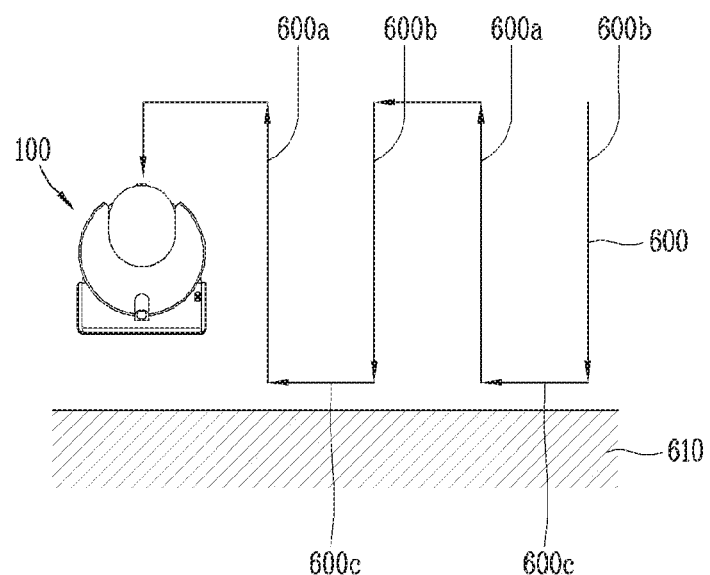
FIGS. 6 to 10 are conceptual views illustrating a traveling method of a cleaner that performs autonomous traveling according to the present disclosure.

The driving pattern 600 shown in FIG. 6, as a zigzag pattern, in a direction perpendicular to one surface of a wall 610 of the cleaning area, is a repetitive combination of a first pattern 600a moving away from the wall, and second pattern 600b moving closer toward the wall.

The zigzag pattern 600 includes a third pattern 600c between the first pattern and the second pattern in a direction parallel to one surface of the wall 610 in order to change the driving direction.

On the other hand, since the suction unit 120 of the cleaner 100 proposed in the present disclosure is provided on a front side of the main body, when moving along the third pattern 600c of FIG. 6, there may be a problem that the cleaning ability for an area adjacent to the wall 610 is deteriorated.

In the following description, a control method of the cleaner 100 for solving the problem is proposed.

Figure 7:
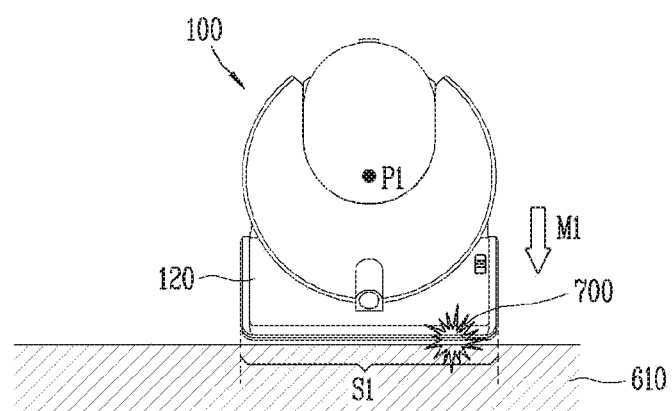

First, referring to FIG. 7, while traveling along a preset traveling pattern 600, the control unit 1800 may sense whether there is a contact 700 between one surface of the main body and a first point of the wall 610 existing in a traveling direction of the main body.

Specifically, while performing a first movement (or first traveling) M1 in a direction toward the wall 610 along a zigzag pattern, the control unit 1800 may determine whether the wall 610 is in contact with the main body using a sensing result of an impact sensor disposed at a front surface of the body.

In other words, when the output of the impact sensor exceeds a reference output, the control unit 1800 may determine that the main body has come into contact with an obstacle or wall existing at the front.

In one implementation, the control unit 1800 may determine that a portion of the main body where the impact sensor is disposed has collided with an obstacle or a wall, by using information related to an installation position of the impact sensor.

As shown in FIG. 7, when the main body is brought into contact with the wall 610, cleaning may be performed on a first portion S1 of the wall 610. Specifically, the first portion S1 may correspond to a portion at which the suction unit 120 of the cleaner 100 comes in contact with the wall 610.

The first portion S1 may correspond to a first point of the wall 610 that primarily comes in contact with the front of the main body. The first point may correspond to the installation position of the impact sensor provided on the outer surface of the main body when the main body and the wall 610 come in contact with each other.

If the cleaner 100 performs the wall following traveling along the wall 610 with a side surface of the main body facing the wall 610 after the cleaner 100 completes cleaning for the first portion S1, the cleaner 100 may not sufficiently clean the wall 610 except for the first portion S1.

Accordingly, the control unit 1800 may control the driving unit 1300 such that one surface of the main body is brought into contact with a second point, different from the initially-contacted first point of the wall 610.

As illustrated in FIG. 7, when the cleaner 100 is brought into contact with the first point of the wall 610, the position of the cleaner 100 is defined as a first position P1.

Figure 8:
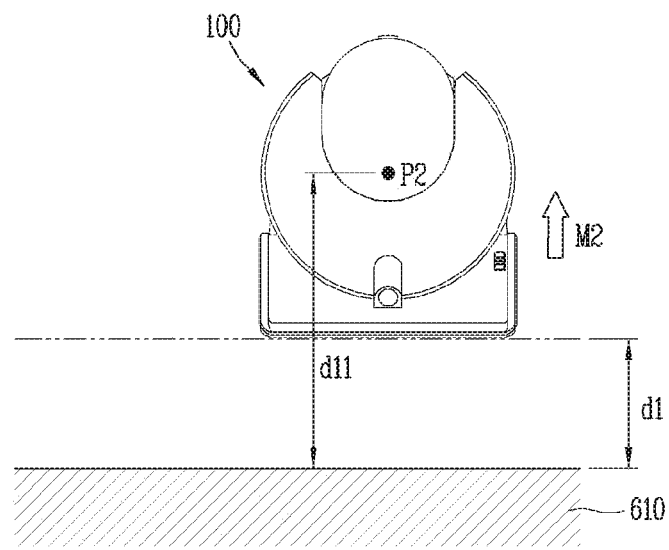

Next, referring to FIG. 8, when one surface of the main body is brought into contact with the first point of the wall, the control unit 1800 may control the driving unit 1300 to perform a second movement (second traveling) M2 for moving the one surface of the main body away from the wall 610.

Specifically, the control unit 1800 may control the driving unit 1300 so that the one surface of the main body is spaced apart from the wall 610 by a preset first distance d1.

For example, when it is determined that the main body and the wall 610 come in contact with each other, the control unit 1800 may control the driving unit 1300 such that the main body runs backward by the first distance d1.

In another example, the control unit 1800 may perform backward travel for a predetermined time so that a second position P2, which is the position of the cleaner 100 after completion of the backward travel, is spaced apart from the wall 610 by a predetermined distance d11.

Meanwhile, the control unit 1800 may variably set the first distance d1 based on the standard of the cleaner 100 or the standard of the main body.

Specifically, the control unit 1800 may set the first distance d1 for moving the main body backward away from the wall 610, based on a rotation radius of the main body.

Also, the control unit 1800 may variably set the first distance d1 based on the standard of the main wheel.

In addition, the control unit 1800 may variably set the first distance d1 based on information related to travel (driving) characteristics of the cleaner 100. Here, the information related to the travel characteristics may include information related to a steering angle range of the cleaner 100.

Figure 9:
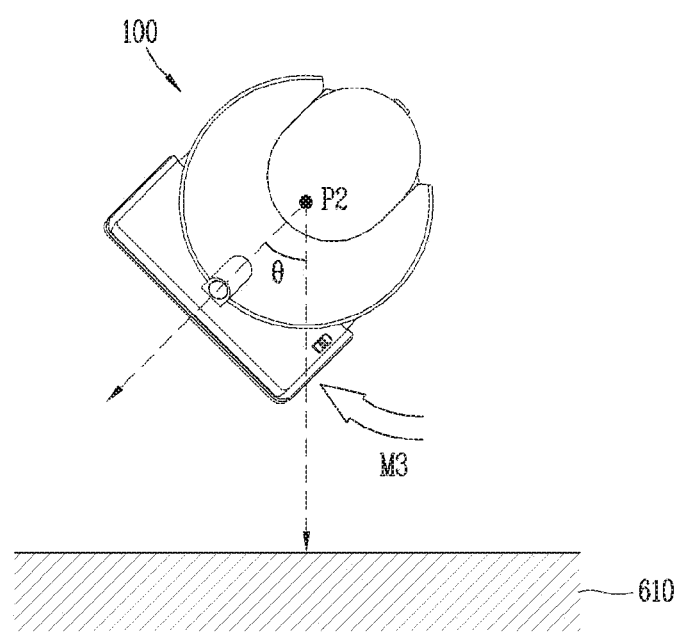

Referring to FIG. 9, after the backward travel of the main body is completed, the control unit 1800 may perform a third movement M3 to rotate the main body by a preset angle θ. In one example, the third movement M3 may be rotation in place at the second position P2 at which the backward travel has been completed.

That is, the control unit 1800 may control the driving unit 1300 so that a direction in which the front of the main body faces is rotated by the preset angle θ while the cleaner 100 is at the second position P2.

In this case, the control unit 1800 may determine in which direction the main body is to be rotated, referring to a movement history of the cleaner 100.

That is, the control unit 1800 may detect an uncleaned area of the wall based on information related to the movement history of the cleaner 100, and control the driving unit 1300 to rotate the main body toward the detected uncleaned area.

Figure 10:
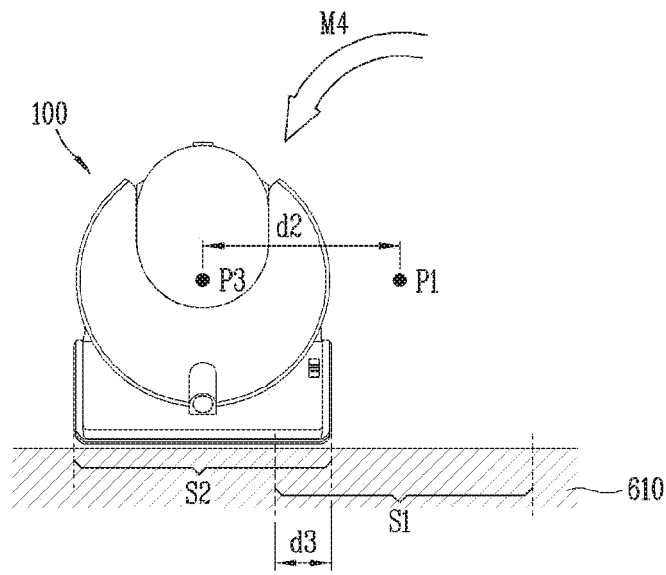

Referring to FIG. 10, when at least one of the second movement M2 for moving the main body backward and the third movement M3 for rotating the main body is completed, the control unit 1800 may control the driving unit 1300 such that the front of the main body is brought into contact again with a second point of the wall, which is spaced apart from the first point of the wall 610 by a second distance d2.

Specifically, the control unit 1800 may perform a fourth movement M4 so that the main body of the cleaner 100 moves along a preset path from the second position P2 to a third position P3.

As illustrated in FIG. 10, one end of the preset path may correspond to the second point of the wall that is spaced apart from the first point of the wall 610 by the second distance d2.

In addition, when the fourth movement (M4) is completed, the one surface of the main body of the cleaner 100 may be brought into contact with the wall 610 again.

In this case, the main body may be brought into contact with a second portion S2 of the wall 610 and perform cleaning for the second portion S2. Like the first portion S1, the second portion S2 may correspond to a portion in which the suction unit 120 of the cleaner 100 comes in contact with the wall 610 after the fourth movement M4 is completed.

Meanwhile, the first portion S1 and the second portion S2 may overlap each other by a third distance d3.

That is, in order to minimize the uncleaned area, the control unit 1800 may control the driving unit 1300 such that the suction unit 120 of the cleaner 100 is brought into contact with the second portion S2 including an area which partially overlaps the already-cleaned first portion S1.

In addition, the control unit 1800 may variably set a size of the overlapped area between the first portion S1 of the wall 610 in which the suction unit of the main body is primarily brought into contact with the wall 610 and the second portion S2 of the wall 610 in which the suction unit is secondarily brought into contact with the wall 610.

In one implementation, the control unit 1800 may set the size of the area where the first portion S1 and the second portion S2 overlap each other, based on a traveling mode of the cleaner 100. In other words, the control unit 1800 may determine a distance between the first point and the second point of the wall 610 or a distance between the first position P1 and the third position P3 of the cleaner 100.

For example, when a first traveling mode for completing cleaning within a relatively short time is set, the control unit 1800 may increase the distance between the first point and the second point. However, the distance between the first point and the second point may be limited to a predetermined upper limit value because the first portion S1 and the second portion S2 are set to overlap each other.

In another example, when a second traveling mode for increasing a cleaning rate is set, the control unit 1800 may decrease the distance between the first point and the second point. However, the distance between the first point and the second point may be set so that the overlapped area between the first portion S1 and the second portion S2 is smaller than half of the first portion S1.

In this way, the first portion S1 of the wall with which the front of the main body of the cleaner 100 has been primarily brought into contact and the second portion S2 of the wall with which the front of the main body has been secondarily brought into contact may partially overlap each other, and the size of the overlapped area may be variably set depending on a control operation of the control unit 1800 of the cleaner 100.

In addition, the distance between the first point of the wall with which the front of the main body of the cleaner 100 has been primarily brought into contact and the second point of the wall with which the front of the main body has been secondarily brought into contact may be variably set depending on a control operation of the control unit 1800 of the cleaner 100.

Furthermore, when the distance between the first point and the second point is changed, then the control unit 1800 may change the first distance d1, which is the distance that the main body runs backward.

For example, when a target distance value between the first point and the second point is changed, the control unit 1800 may increase the first distance d1 as the distance by which the cleaner 100 is moved backward by the second travel M2 after the front of the main body is initially brought into contact with the wall 610.

In this way, by variably setting control variables related to the first to fourth movements M1 to M4, the control unit 1800 of the cleaner 100 according to the present disclosure may control the driving unit 1300 such that an angle between a direction perpendicular to the wall 610 and a direction along which the main body travels is within a predetermined angle range when the front of the main body is secondarily brought into contact with the wall 610.

Figure 11:
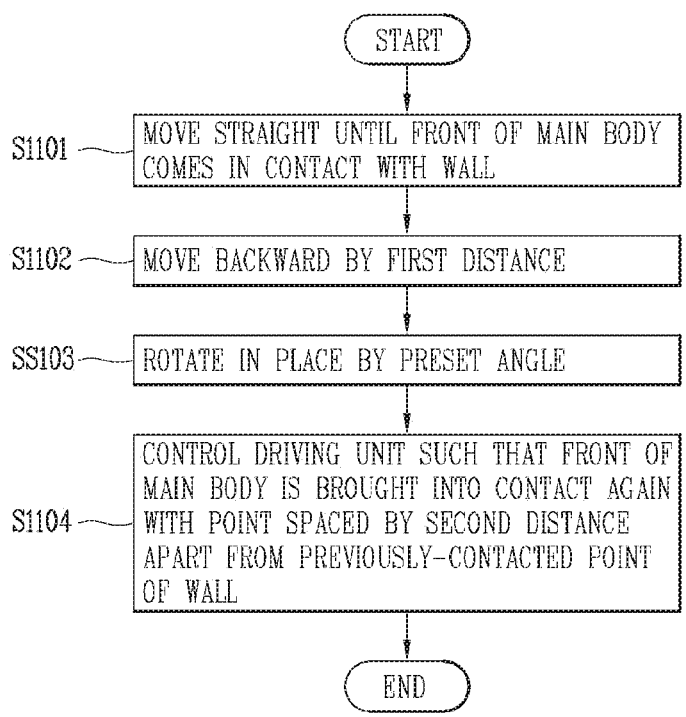
FIG. 11 is a flowchart illustrating a control method of a cleaner that performs autonomous traveling according to the present disclosure.

Referring to FIG. 11, a flowchart illustrating first to fourth movements M1, M2, M3, M4 shown in FIGS. 6 to 10 is shown.

First, the control unit 1800 may control the driving unit 1300 so that the cleaner 100 moves straight until the front of the main body contacts the wall 610 (S1101).

When the front of the main body is brought into contact with the first point of the wall 610, the control unit 1800 may move the cleaner 100 backward so that the front of the main body is spaced apart from the wall 610 by the first distance d1 (S1102).

When the backward movement is completed, the control unit 1800 may control the driving unit 1300 so that the main body of the cleaner 100 rotates in place (S1103).

When the rotation is completed, the control unit 1800 may control the driving unit 1300 so that the front of the main body is brought into contact again with the second point of the wall that is spaced by the second distance d2 apart from the first point of the wall, with which the front of the main body has been brought into contact (S1104).

Hereinafter, a description will be given of another implementation of the autonomous cleaner 100 according to the present disclosure, with reference to FIGS. 12 and 13.

Figure 12:
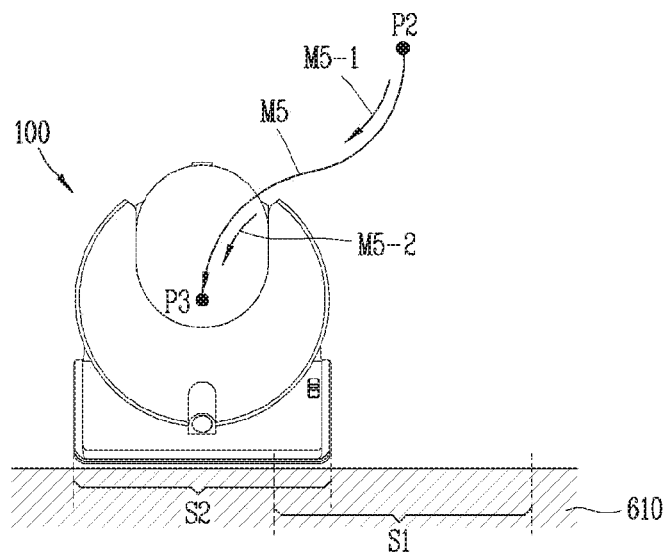
FIG. 12 is a conceptual view illustrating a traveling method of a cleaner that performs autonomous traveling according to the present disclosure.

Referring to FIG. 12, after the backward movement is completed, the control unit 1800 may control the driving unit 1300 to move the main body along a first arcuate path M5-1 and a second arcuate path M5-2, such that the front of the main body is brought into contact with the second point of the wall 610.

That is, after the front of the main body is spaced apart from the wall 610 by the first distance d1, the control unit 1800 may control the driving unit 1300 to perform a fifth movement M5 for moving the main body along the first arcuate path M5-1 and the second arcuate path M5-2, such that the main body is brought into contact with the second point of the wall 610.

Figure 13:
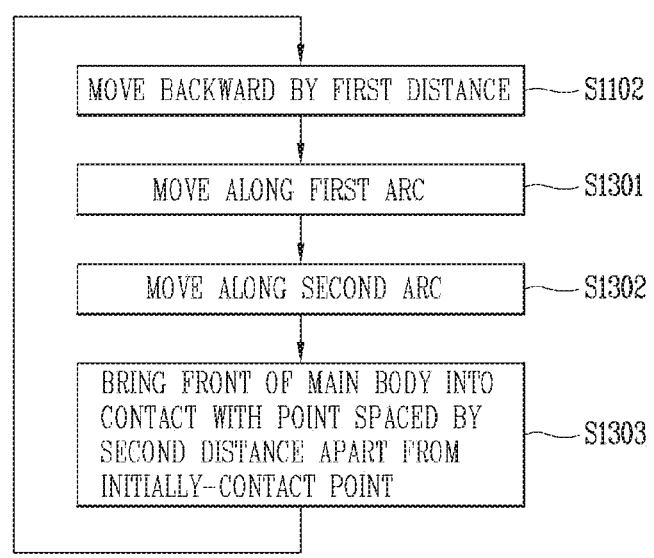
FIG. 13 is a flowchart illustrating a control method of a cleaner that performs autonomous traveling according to the present disclosure.

FIG. 13 is a flowchart illustrating the implementation shown in FIG. 12.

Referring to FIG. 13, when it is determined that the front of the main body is in contact with the first point of the wall, the control unit 1800 may move the main body backward to be spaced apart from the wall by the first distance (S1102).

Thereafter, the control unit 1800 may control the cleaner 100 to travel along the first arcuate path M5-1 (S1301).

Sequentially after the step S1301 of controlling the cleaner to travel along the first arcuate path M5-1, the control unit 1800 may control the cleaner 100 to travel along the second arcuate path M5-2 (S1302).

Accordingly, the control unit 1800 may control the driving unit 1300 until the front of the main body is brought into contact with the second point, which is spaced by the second distance d2 apart from the first point which is the initial contact point between the main body and the wall.

Referring back to FIG. 12, the control unit 1800 may control the main body of the cleaner to move from the second position P2 to the third position P3 along an S-shaped path.

In one example, one end of the second arcuate path M5-2 may be set to correspond to the second point of the wall 610.

In another example, a curvature of the first arcuate path M5-1 may correspond to a curvature of the second arcuate path M5-2.

The implementation illustrated in FIG. 12 may be applied to the cleaner 100 that does not rotate in place.

On the other hand, the traveling process described with reference to FIGS. 8 and 12 may include the second movement M2 for moving the cleaner or main body backward in a direction perpendicular to the wall 610.

Figure 14:
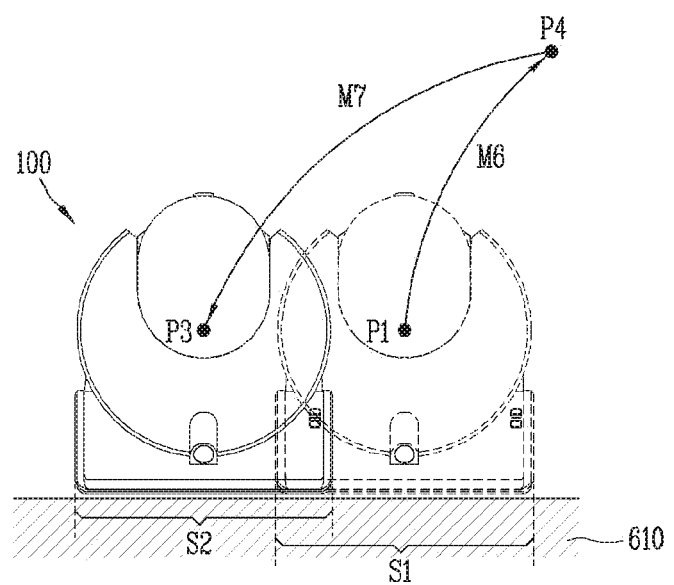
FIG. 14 is a conceptual view illustrating a traveling method of a cleaner that performs autonomous traveling according to the present disclosure.

In contrast, FIG. 14 illustrates that a traveling (driving) method by which the main body of the cleaner travels away from the wall 610 along a curved path and then moves from the spaced point toward the wall 610 along another curved path.

Referring to FIG. 14, when the main body and the wall 610 come in contact with each other, the control unit 1800 may perform a sixth movement M6 for moving the main body of the cleaner 100 away from the wall 610 along a first curved path.

When the sixth movement M6 for moving the main body along the first curved path is completed, the control unit 1800 may perform a seventh movement M7 for moving the main body along a second curved path such that the front of the main body is brought into contact again with the second point of the wall spaced by the second distance apart from the first point of the wall 610.

As illustrated in FIG. 14, the second curved path may be set to be longer than the first curved path. That is, the control unit 1800 may set the travel path of the seventh movement M7 for moving the main body toward the wall 610 again to be longer than the travel path of the sixth movement M6 for moving the main body away from the wall 610.

Also, a curvature of the first curved path may be set to be larger than that of the second curved path. That is, the control unit 1800 may set the curvature of the travel path of the seventh movement M7 for moving the main body toward the wall 610 again to be smaller than the curvature of the travel path of the sixth movement M6 for moving the main body away from the wall 610.

According to the present disclosure, a robot cleaner may perform precise traveling (movement) in an area around a wall to clean a cleaning area thoroughly, thereby improving performance of the cleaner.

In particular, according to the present disclosure, an uncleaned area in which cleaning cannot be performed by zigzag movement may be minimized, thereby improving user's satisfaction with the cleaner.

What is claimed is:

1. A cleaner performing autonomous traveling, the cleaner comprising:
   a main body;
   a driving unit configured to move the main body;
   a suction unit installed on a front surface of the main body; and
   a control unit configured to control the driving unit to move the main body based on a preset traveling pattern,
   wherein the control unit is configured to,
      control, when one surface of the main body is brought into contact with a first point of a wall existing in a traveling direction of the main body while the main body moves along the preset traveling pattern, the driving unit such that the one surface of the main body is spaced apart from the wall and then brought into contact with a second point of the wall.

2. The cleaner of claim 1, further comprising a sensor disposed on a surface of the main body in the traveling direction of the main body to sense an external physical force,
   wherein the control unit determines whether the main body is brought into contact with the wall, based on a sensing result of the sensor.

3. The cleaner of claim 2, wherein the control unit controls the driving unit to move the main body backward from the wall by a preset first distance when the main body is brought into contact with the wall.

4. The cleaner of claim 3, wherein the control unit controls the driving unit such that a front surface of the main body is brought into contact with the second point of the wall again, spaced by a second distance apart from the first point, when the backward movement of the main body is completed.

5. The cleaner of claim 4, wherein the control unit controls the driving unit such that the main body rotates in place by a predetermined angle and moves along a preset path, when the backward movement of the main body is completed.

6. The cleaner of claim 2, wherein the control unit sets a direction of rotating the main body based on information related to a movement history of the main body before the main body is brought into contact with the first point.

7. The cleaner of claim 6, wherein the control unit detects an uncleaned area of the wall based on the information related to the movement history, and controls the driving unit such that the main body rotates toward the detected uncleaned area.

8. The cleaner of claim 5, wherein one end of the preset path corresponds to the second point.

9. The cleaner of claim 2, wherein the control unit controls the main body to move away from the wall along a first curved path when the main body is brought into contact with the wall.

10. The cleaner of claim 9, wherein the control unit controls the driving unit such that the front surface of the main body is brought into contact again with the second point, spaced by a second distance apart from the first point, when the movement of the main body along the first curved path is completed.

11. The cleaner of claim 10, wherein the control unit controls the main body to move along a second curved path when the movement of the main body along the first curved path is completed.

12. The cleaner of claim 11, wherein the control unit sets the second curved path to be longer than the first curved path.

13. The cleaner of claim 11, wherein the control unit sets a curvature of the first curved path to be larger than a curvature of the second curved path.

14. The cleaner of claim 2, wherein the control unit sets a distance between the first point and the second point based on information related to a standard of the main body, and
   controls the driving unit to move the main body based on the set distance.

15. The cleaner of claim 2, wherein the control unit sets a distance between the first point and the second point based on a traveling mode of the cleaner, and
   controls the driving unit to move the main body based on the set distance.

* * * * *